United States Patent [19]
Mathew et al.

[11] Patent Number: 6,165,530
[45] Date of Patent: Dec. 26, 2000

[54] HOLLOW CORN-BASE SNACK FOOD PRODUCTS

[75] Inventors: John Mampra Mathew; Richard Edward Dunham; Rocco Dominic Papalia; William Richard Dyer, all of Plano, Tex.

[73] Assignee: Recot, Inc., Pleasanton, Calif.

[21] Appl. No.: 09/366,546

[22] Filed: Aug. 4, 1999

[51] Int. Cl.[7] ............................ A21D 13/00; A23B 4/03; A23B 4/044
[52] U.S. Cl. ..................... 426/446; 426/560; 426/559; 426/502; 426/503
[58] Field of Search .................................. 426/559, 560, 426/445, 446, 502, 503

[56] References Cited

U.S. PATENT DOCUMENTS

| | | | |
|---|---|---|---|
| 3,027,258 | 3/1962 | Markakis et al. | 99/81 |
| 4,241,106 | 12/1980 | Time | 426/138 |
| 4,396,637 | 8/1983 | Singer | 426/549 |
| 4,806,377 | 2/1989 | Ellis et al. | 426/549 |
| 4,834,996 | 5/1989 | Fazzolare et al. | 426/28 |
| 4,873,093 | 10/1989 | Fazzolare et al. | 426/28 |
| 5,104,673 | 4/1992 | Fazzolare et al. | 426/549 |
| 5,320,858 | 6/1994 | Fazzolare et al. | 426/549 |
| 5,362,511 | 11/1994 | Villagran et al. | 426/549 |
| 5,384,136 | 1/1995 | Lai et al. | 426/19 |
| 5,397,587 | 3/1995 | Thompson et al. | 426/557 |
| 5,429,834 | 7/1995 | Addesso et al. | 426/549 |
| 5,456,933 | 10/1995 | Lee | 426/549 |
| 5,554,405 | 9/1996 | Fazzolare et al. | 426/560 |
| 5,580,583 | 12/1996 | Caridis et al. | 425/142 |
| 5,626,898 | 5/1997 | Caridis et al. | 426/502 |
| 5,652,010 | 7/1997 | Gimmler et al. | 426/549 |
| 5,690,982 | 11/1997 | Fazzolare et al. | 426/550 |

*Primary Examiner*—Nina Bhat
*Attorney, Agent, or Firm*—Rothwell, Figg, Ernst & Manbeck

[57] ABSTRACT

A hollow snack food product is prepared by finish cooking a hollow pellet product. The hollow pellet is manufactured from a pre-cooked, predominantly corn-masa based dough which contains sufficient vital wheat gluten to allow the pellet to open up and assume the desired hollow structure upon cutting. The pellets are prepared by overlaying dough sheets, stretching the dough sheets to impart strain thereto, and then cutting individual pieces from the stretched sheets.

15 Claims, No Drawings

HOLLOW CORN-BASE SNACK FOOD PRODUCTS

BACKGROUND OF THE INVENTION

1. Technical Field

This invention relates generally to hollow corn based snack food products. More particularly, this invention relates to the preparation of a laminated pellet product which delaminates immediately upon cutting, and which then expands upon finish cooking.

2. Description of the Background Art

Corn based snack food products (i.e., snack products made entirely or predominantly from corn flour or corn masa) are well known. Due to the chemical makeup of corn, these products consist almost entirely of starch and have little or no gluten. Consequently, the doughs used to prepare such products are, relatively speaking, not very elastic. Snack products made from corn masa, such as tortilla chips, often are prepared by sheeting the masa, cutting individual pieces and then cooking the pieces via, for example, baking or frying. Snack food products made predominantly from corn flour, such as the well-known Fritos® brand corn chips, often are prepared by extruding a hydrated corn flour based dough, cutting the extrudate into individual pieces and then finish cooking the individual pieces.

Hollow snack food products produced from corn-based flour, such as Bugles® brand snack products, are known. They are relatively expensive to ship because of their low bulk density, and their delicate nature makes them susceptible to crushing or breaking. Bugles brand products are believed to be manufactured generally according to a process in which corn grits are steeped in the presence of sodium bicarbonate and then cooked with sucrose, salt and water. The resulting dough is cooled, sheeted and formed into pieces that are dried to shelf-stable pellets at about 12% moisture content. The pellets are fried to form the finished product. See U.S. Pat. No. 3,348,950.

Pellet or "half product" technology is well known in the snack food industry. Snack foods produced as pellet products are characterized by the centralized production of an intermediate pellet-stage product which can be shipped to various remote locations where the finished product is prepared by "finish cooking" the pellets. For the purposes of this disclosure, the term "finish cooking" means subjecting the product to heat and may include one or more of the processes that can occur when farinaceous products are subjected to heat, including dehydration, gelatinization of starches, denaturation of proteins, and the browning of sugars. As used herein, "finish cooking" is, at least, responsible for imparting to the product the desired final textural attributes and moisture content. Finish cooking can be carried out, for example, by subjecting the pellet to frying, baking (hot air impingement), microwave heating, etc. Pellet products offer advantages, including a high bulk density (making them less expensive to ship) and greater resistance to breakage during shipment. Additionally, the use of a pellet process permits portions of the manufacturing process to be centralized. The pellet stage product must be storage stable because, by design, a period of time may elapse between preparation of the pellet and the finish cooking operation.

SUMMARY OF THE INVENTION

In one aspect, the present invention provides an at least partially cooked corn masa dough that contains an amount of vital wheat gluten effective to improve the elasticity of the dough. The presence of an effective amount of vital wheat gluten permits sheets or ribbons of the dough to be strained (stretched) and then cut. Upon cutting individual pieces from the strained sheets, the pieces open up to form the desired hollow shape. An amount of vital wheat gluten that is effective to ensure that the pieces open up when cut (hereinafter "an effective amount") should be present. Preferably, the amount of vital wheat gluten will be optimized so as to also maximize the corn flavor of the product.

Another aspect of the invention relates to a process for preparing a hollow, low-density corn-based snack food product. The process includes the steps of overlaying two sheets of a corn-based dough that contains an effective amount of vital wheat gluten, stretching the sheets to impart strain thereto, and then cutting pieces from the stretched dough. The pieces are then dried to a desired moisture content. The amount of vital wheat gluten is sufficient to permit the pieces to open up upon cutting so as to take on the desired hollow configuration. The pellet retains its shape during the drying process. The thus-prepared pellet product subsequently can be finish cooked, e.g. by frying, whereupon the final textural properties and moisture content are attained. During frying, the pellet opens up further and expands in biaxial directions to form the desirable final shape.

DETAILED DESCRIPTION OF THE PREFERRED EMBODIMENTS

The pellet product of the present invention is prepared from an at least partially cooked dough that is comprised predominantly of corn masa, water and an elasticity-enhancing amount of vital wheat gluten. The corn masa may be prepared via known methods from whole corn that is de-germed, then treated with lime, water and/or steam, and heated. Alternatively, commercially-available dried masa mix may be used. By "comprised predominantly of corn masa" we mean that the dough, on a dry weight basis, contains at least about 70% by weight of corn masa.

Vital wheat gluten is a commercially available wheat protein concentrate that is prepared by removing starch from wheat flour and carefully drying the remaining high-protein material (gluten) so as to retain the native properties of the protein. The designation "vital" is used to indicate that the protein retains its native elastic properties which are required in the context of the present invention to ensure that the dough layers will delaminate upon finish cooking. "Wheat gluten" that does not possess the native elastic properties is commonly available, but is not substitutable for vital wheat gluten in this context. The addition of vital wheat gluten to the corn masa-based dough in an amount of at least about 0.25% by weight, preferably between about 0.25 and 10% by weight (based on the total weight of all ingredients other than water), adds sufficient elasticity to provide a corn masa-based dough which, in accordance with the invention, may be pre-cooked, extruded, embossed, overlaid, stretched, laminated and cut into individual pieces to produce a relatively high-moisture hollow product, pre-dried and then finish dried to produce a hollow pellet product. The hollow pellet product, when finish cooked, preferably by frying, expands to produce a final product having the desired shape and textural characteristics. Those skilled in the art will be able to select an appropriate amount of vital wheat gluten based upon the teachings herein.

The addition of a gluten-containing ingredient provides the elasticity necessary to create a workable dough and, importantly, necessary to allow the pellet product to deform (open up) into the desired configuration upon cutting. Although wheat flour and other gluten containing flours have been mixed with starchy doughs to increase the cohesiveness of doughs prior to cooking, the addition of such flours adversely impacts the flavor of the finished product. Corn-based snack food products can have a distinctive, toasted-corn flavor, and this flavor is undesirably diluted if sufficient gluten in the form of a gluten-containing flour is added. Consequently when vital wheat gluten is added to the dough as opposed to a gluten containing flour, toasted corn flavor, an important feature of the final snack product, is not lost. Moreover, in the pellet products of the present invention, the elasticity imparted by the vital wheat gluten is required after the dough is at least partially cooked.

To the extent that the addition of the vital wheat gluten causes any reduction to the desired toasted corn flavor, this can be compensated for via the addition of one or more sugars, salt, sodium bicarbonate and/or other flavorings, seasonings, etc. The Maillard browning reaction can produce a toasted corn flavor following the addition of wheat gluten, and an alkaline pH of between 7.8 to 9.2 is known to enhance this reaction. Sodium bicarbonate may therefore be added to the dough in sufficient amount to increase the pH to the 7.8–9.2 range, thereby increasing the extent of Maillard browning, as one method of providing an intensified toasted corn flavor. The use of other ingredients, such as emulsifiers (e.g. distilled mono-glyceride), will be immediately apparent to those skilled in the field of food science.

In general, a pellet product is produced according to the present invention by preparing a hydrated dough that is comprised predominantly of corn masa along with an elasticity-enhancing amount of vital wheat gluten, in view of the required elasticity of the cooked dough as described herein. The dough preferably is fully cooked and processed into relatively thin sheets. The sheets may be embossed. Two such sheets are arranged in an overlapping configuration (overlaid). Strain is imparted by stretching the sheets in the longitudinal (machine) direction, after which individual pieces are cut from the stretched sheets. In a preferred embodiment the longitudinal edges of the pieces are sealed during the cutting process and the transverse edges remain unsealed. In an especially preferred embodiment, the pieces are trapezoidal in shape and open up to form a frustum shape. The individual pieces remain strained (i.e., the potential energy imparted by the stretching step remains in the product) until they are cut from the sheets. The pieces open up to form a hollow product immediately upon cutting. The strain imparted during the stretching step induces the product to assume the desired open configuration immediately upon exiting the cutter. In the preferred trapezoidal shape, the longitudinal edges of the trapezoid are sealed by the cutter apparatus and remain sealed when the pieces open.

Preferred dough formulations can be prepared by loading into a preconditioner a mixture containing about 80–95% of commercially available precooked corn masa (20% precooked), about 0.25 to 10% vital wheat gluten, about 0.2 to 2% sodium bicarbonate, about 1 to 7% sugar, and about 0.2 to 5% salt. (Unless otherwise noted, all percentages are expressed as percent by weight of the total ingredient weight.) Water and steam are added to the dry ingredients in the preconditioner in sufficient amount to create a workable dough. Preferred hydrated dough formulations contain between about 20% and 40% water, preferably about 28% water, based on the weight of the entire formulation. In a preferred process water is added at a rate of about 20 to 50 lbs/hr and the steam at a rate of about 1 to 20 lbs/hr. The dough is mixed in the preconditioner for approximately two minutes prior to being free-fed into a cooker-extruder apparatus.

The dough may be processed, cooked and formed into relatively thin sheets via a variety of known food processing methods. The use of a cooker-extruder is preferred for large-scale production. For example, the uncooked dough can be continuously fed to the inlet of a multi-zone extruder wherein at least some of the zones are provided with heat jackets so that cooking is accomplished within the jacketed zones. The dough will be at least partially cooked, and preferably fully cooked, within the cooker-extruder apparatus. The configuration of the cooker-extruder and its operating parameters can be varied, and optimal settings can be determined experimentally, by those skilled in the art. It will be recognized that extruder configuration and operation will vary depending upon the composition of the dough and the attributes that are desired for the finished product. The operation of the cooker-extruder, including such parameters as the speed (rpm) of the extruder screws, the residence time in each stage and the operating temperatures of each stage may be governed by a programmable controller that monitors and adjusts the operation parameters according to a pre-programmed profile.

Generally, water is added to the dough in the extruder at a rate of about 1 to 20 lbs/hr until the dough contains approximately 20 to 40% moisture. The dough is fully cooked in the extruder. The extruder temperatures range from 60–300° F. The cooked, machined dough emerges from the extruder in sheet form at approximately 200° F. Dough at this temperature is too sticky to be cut and is conditioned to between about 90° and 120° F. using an ambient cooler for about 30 to 70 seconds. Once cooled, the sheets can be embossed to prevent blistering of the final product.

When extruder apparatus are used to prepare the thin dough sheets, such apparatus can be set up in tandem to provide two continuous sheets that can be juxtaposed and then overlaid. Alternatively, a single sheet can be extruded and then slit or otherwise subdivided to provide sheets that can be overlaid. The dough sheets preferably are overlaid and then stretched longitudinally (lengthwise in the machine direction) to impart a strain of, preferably, between about 10 and about 20%. That is, the length of the sheets is increased by about 10 to about 20%, although differing amounts of strain can be imparted to obtain products with differing characteristics. The sheets can be stretched by, for example, passing them through sets of rollers operating at a speed differential. The longitudinal edges are sealed, and individual pieces are cut from the stretched dough sheets using a cutter apparatus. In the preferred embodiment the pellet is cut in a frusto-conical shape and opens into a frustum when released from the cutter.

Once cut, the pellets are dried to a moisture content of between 8 to 15%. The pellets can be finish cooked immediately, or the pellets can be shipped or stored, and finish cooked at a future date.

The pellets can be finish cooked using a variety of methods known in the snack food industry. The pellets can be fried, baked, or cooked via a combination of frying and baking. The pellets can be deep fried in cooking oil (e.g. a mixture of naturally-occurring animal and/or vegetable fats and/or oils, and/or synthetic cooking oil such as Olestra), at a temperature between about 300° and 425° F. for approximately 5 to 60 seconds. Alternatively, the pellets may be baked in hot air ovens at a temperature, for example, between 200° and 400°. If desired, the pellets may be sprayed with a thin layer of oil prior to or during the baking process. The pellets may then be seasoned as desired with oil, salt, nacho cheese flavoring or other desired seasoning.

The following Example provides one method for carrying out the present invention.

EXAMPLE

A dry ingredient blend was made by mixing 192.08 lb. yellow corn masa, 7.12 lb. extra-fine granulated sugar, 4.00 lb. vital wheat gluten, 0.3 lb. emulsifier, 3.72 lb. salt, and 1.01 lb. sodium bicarbonate in a ribbon mixer for 10 minutes. The thus-prepared pre-mix was fed into a preconditioner at a feed rate of 135 lb./hr. Water and steam were added into the pre-conditioner at a rate of 35 lb./hr. and 10 lb./hr., respectively. The differential diameter pre-conditioner screw speeds were 120 rpm and 240 rpm. The pre-conditioned mix temperature was 170° F. This mix was then fed into a 9 zone twin screw extruder with a length and diameter ratio of 25.0. All zones, except the inlet zone (Zone 1), had temperature controls for heating/cooling the barrel. The temperature set points for each zone was: Zone 2=230° F., Zone 3=230° F., Zone 4=240° F., Zone 5=240° F., Zone 6=195° F., Zone 7=175° F., Zone 8=155° F., Zone 9=150° F.

Water was added into Zone 2 of the extruder at a rate of 10 lb./hr. The extruded, cooked dough was formed into two 3 inch wide sheets using a slit die. Die pressure was 219° F. The extruded sheet had a moisture content of 32%. The sheets were then cooled and conditioned to a temperature of 105° F. The sheets were then embossed, overlaid, stretched, laminated and cut using an embosser-cutter assembly. The cut pellets opened up to form a frustum shape at cutter exit. The pellets were pre-dried and then finish-dried to a final moisture content of 12%. The dryer temperature setpoint was 185° F. and the relative humidity setpoint was 6%. The dried pellets were fried in vegetable oil at 360° F. for 20 seconds, whereupon they had a final moisture content of less than about 5%.

Although the invention has been described in connection with various preferred ingredients, formulations, it is not so limited. For example, farinaceous ingredients other than or in addition to corn masa may be employed. Based upon the teachings herein, those skilled in the art will be able to vary ingredients, formulations and processing steps to make modifications of the presently described preferred embodiments.

What is claimed is:

1. A method for preparing an at least partially cooked snack food pellet product, comprising:
   (a) providing an at least partially cooked hydrated dough comprising corn masa and an effective amount of vital wheat gluten;
   (b) overlaying two elongate sheets of said hydrated dough so that said sheets are substantially contiguous;
   (c) imparting strain upon said overlayed dough sheets by streching said dough sheets; and
   (d) cutting individual pellets from said strained dough sheets;

wherein said at least partially cooked hydrated dough comprises an amount of vital wheat gluten sufficient to permit said individual pellets to open up immediately upon said cutting step due to said imparted strain.

2. The method according to claim 1, wherein said dough comprises at least about 70% by weight of corn masa.

3. The method according to claim 1, wherein said dough comprises about 80% to about 95% of precooked corn masa.

4. The method according to claim 1, wherein said dough comprises at least about 0.25% by weight of vital wheat gluten.

5. The method according to claim 1, wherein said dough comprises about 0.25% to about 10% by weight of vital wheat gluten.

6. The method according to claim 3, wherein said dough comprises at least about 0.25% by weight of vital wheat gluten.

7. The method according to claim 3, wherein said dough comprises about 0.25% to about 10% by weight of vital wheat gluten.

8. The method according to claim 1, wherein said hydrated dough has a pH of between about 7.8 and about 9.2.

9. The method according to claim 5, wherein said hydrated dough has a pH of between about 7.8 and about 9.2.

10. The method according to claim 7, wherein said hydrated dough has a pH of between about 7.8 and about 9.2.

11. The method according to claim 1, wherein the hydrated dough further comprises one or more of sugar, salt, emulsifier and sodium bicarbonate.

12. The method according to claim 1, further comprising embossing the elongate dough sheets.

13. The method according to claim 3, further comprising embossing the elongate dough sheets.

14. The method according to claim 7, further comprising embossing the elongate dough sheets.

15. The method according to claim 9, further comprising embossing the elongate dough sheets.

* * * * *